United States Patent [19]
Piskiel et al.

[11] Patent Number: 5,893,911
[45] Date of Patent: Apr. 13, 1999

[54] METHOD FOR DEFINING AND APPLYING RULES FOR MESSAGE DISTRIBUTION FOR TRANSACTION PROCESSING IN A DISTRIBUTED APPLICATION

[75] Inventors: Harold Aron Piskiel, Manalapan, N.J.; Mitchell Scott Krieger, Woodmere; Benjamin Chien-Wen Lee, Bayside, both of N.Y.; Christopher Blair Preston, Englewood, Colo.

[73] Assignee: Neon Software, Inc., Englewood, Colo.

[21] Appl. No.: 08/634,024

[22] Filed: Apr. 17, 1996

[51] Int. Cl.[6] .................................................. G06F 17/30
[52] U.S. Cl. .................. 707/10; 395/200.33; 395/200.47
[58] Field of Search .................................. 707/3, 4, 5, 10; 395/200.33, 200.47, 200.48, 200.49

[56] References Cited

U.S. PATENT DOCUMENTS

| | | | |
|---|---|---|---|
| 4,363,093 | 12/1982 | Davis et al. | 395/200.57 |
| 4,688,170 | 8/1987 | Waite et al. | 395/500 |
| 4,718,005 | 1/1988 | Feigenbaum et al. | 395/200.52 |
| 4,751,635 | 6/1988 | Kret | 707/10 |
| 4,815,030 | 3/1989 | Cross et al. | 707/10 |
| 4,823,122 | 4/1989 | Mann et al. | 340/825.28 |
| 4,851,988 | 7/1989 | Trottier et al. | 395/200.56 |
| 4,914,583 | 4/1990 | Weisshaar et al. | 395/680 |
| 4,937,784 | 6/1990 | Masai et al. | 395/674 |
| 4,975,830 | 12/1990 | Gerpheide et al. | 395/200.58 |
| 4,975,904 | 12/1990 | Mann et al. | 370/389 |
| 4,975,905 | 12/1990 | Mann et al. | 370/409 |
| 4,992,972 | 2/1991 | Brooks et al. | 345/338 |
| 4,999,771 | 3/1991 | Ralph et al. | 395/281 |
| 5,058,108 | 10/1991 | Mann et al. | 370/409 |
| 5,062,037 | 10/1991 | Shorter et al. | 395/670 |
| 5,073,852 | 12/1991 | Siegal et al. | 395/680 |
| 5,101,406 | 3/1992 | Messenger | 370/349 |
| 5,187,787 | 2/1993 | Skeen et al. | 395/680 |
| 5,212,768 | 5/1993 | Itsuki et al. | |
| 5,212,792 | 5/1993 | Gerety et al. | |
| 5,257,369 | 10/1993 | Skeen et al. | 395/680 |
| 5,428,606 | 6/1995 | Moskowitz | 370/400 |
| 5,539,735 | 7/1996 | Moskowitz | 370/420 |
| 5,557,798 | 9/1996 | Skeen et al. | 705/35 |

FOREIGN PATENT DOCUMENTS

| | | |
|---|---|---|
| A-41416/89 | 12/1989 | Australia. |
| A-41417/89 | 12/1989 | Australia. |
| A-79455/91 | 3/1992 | Australia. |
| 0 108 233 A2 | 5/1984 | European Pat. Off.. |
| 0 130 375 A2 | 1/1985 | European Pat. Off.. |
| 0 167 725 A2 | 1/1986 | European Pat. Off.. |
| 0 216 535 A2 | 4/1987 | European Pat. Off.. |
| 0 258 867 A2 | 3/1988 | European Pat. Off.. |
| 0 380 211 A2 | 8/1990 | European Pat. Off.. |
| 0 387 462 A1 | 9/1990 | European Pat. Off.. |
| 0 490 636 A2 | 6/1992 | European Pat. Off.. |
| 57-092954 | 6/1982 | Japan ................... H04L 13/00 |
| 63-050140 | 3/1988 | Japan ................... H04L 11/20 |
| 63-174159 | 7/1988 | Japan ................... G06F 15/16 |
| 63-214045 | 9/1988 | Japan ................... H04L 11/20 |
| 2191069 | 2/1987 | United Kingdom. |
| 2205018 | 11/1988 | United Kingdom. |
| WO95/10805 | 4/1995 | WIPO. |
| WO 95/16235 | 6/1995 | WIPO. |

OTHER PUBLICATIONS

Epstein, S.; Reasoning and Representation in RiTSE; Proceedings of the 1987 IEEE International Conference on Systems, Man, and Cybernetics, vol. 1 of 3; Oct. 20–23, 1987; pp. 135–139.

Williams, P., IBM MQSeries Commercial Messaging, SIGICE Bulletin, vol. 20, No. 4, Apr. 1995, pp. 7–26.

Andreula et al., Creating An Open Systems Compatible Message Queueing Systems, Proceeding of the 13th Annual International Phoenix Conference on Computers and Communications, Apr. 12–15, 1994, Phoenix, AZ, IEEE, pp. 19–23.

Birman et al.; Programming Your Way Out of the Past ISIS and the META Project; Sun Technology; Summer 1989.

Collyer; News Need Not Be Slow; Winter 1987 USENIX Technical Conference Proceedings.

Henderson; The USENET System, Part One: Introductory Illuminations; 1987.

Reiss; Integration Mechanisms in the FIELD Environment; Technical Report No. CS–88–18; Department of Computer Science, Brown University, 1987.

Tanenbaum et al.; A Retrospective and Evaluation of the Amoeba Distributed Operating System; Dept. of Mathematics and Computer Science, Vrije Universiteit, 1988.

Birman et al.; Exploiting Virtual Synchrony in Distributed Systems; Dept. of Computer Science, Cornell University, Operating Systems Review: Proceedings of the Eleventh ACM Symposium on Operating Systems Principles, ACM 1987.

IBM; BASIS Application Programming Interface (API); (AKA DataTrade).

Gelernter; The Metamorphosis of Information Management; Scientific American Aug. 1989.

Schroeder et al.; Experience with Grapevine: The Growth of a Distributed System; ACM Transactions on Computing Systems, Feb. 1984.

Cheriton et al.; Distributed Process Groups in the V Kernel; ACM Transactions on Computing Systems, May 1985.

Birman et al.; The ISIS System Manual; The ISIS Project, 1988.

Gibbons; A Stub Generator for Multilanguage RPC in Heterogeneous Environments; IEEE Transactions on Software Engineering, Jan. 1987.

ISO 8824 Recommendation X.208; Specification of Abstract Syntax Notation One (ASN.1); ISO Melbourne 1988.

Birman et al.; Reliable Communication in the Presence of Failures; ACM Transactions on Computer Systems, Feb. 1987.

Lum et al.; A General Methodology for Data Conversion and Restructuring; IBM J.Res. Devel., Sep. 1976.

IBM; Revisable Form Document Conversion; IBM TDB Oct. 1985.

Gordon; Providing Multiple-Channel Communication Using the Experimental Digital Switch; IEEE Transactions on Communications, Jun. 1982.

Hughes; A Multicast Interface for UNIX 4.3; Software—Practice and Experience, Jan. 1988.

Frank et al.; Multicast Communication on Network Computers; IEEE Software, May 1985.

Skeen et al.; Reliable Message Diffusion; Teknekron, Oct. 1987.

Oskiewicz et al.; A Model for Interface Groups; ANSA ISA Project Sep. 1990.

French et al.; The Zephyr Programmer's Manual; Apr. 1989.

Eichen et al.; The Zephyr Notification Service; DEC Project Athena, MIT, Feb. 1988.

DellaFera et al.; Section E.4.1 Zephyr Notification Service; Project Athena Technical Plan; MIT, Jun. 1989.

Belville et al.; Zephyr on Athena; MIT Sep. 1991.

ISIS Distributed Systems Toolkit API.

ISIS Distributed News, ISIS Distributed Systems, Inc. 1991.

ISIS Distributed Toolkit Reference Manual pp. 17-8..17-21.

IBM; BASIS (AKA Datatrade) technical presentation slides.

*Primary Examiner*—Zarni Maung
*Attorney, Agent, or Firm*—Lee, Fishman & Isaac, LLP; Daniel N. Fishman; John L. Isaac

[57] ABSTRACT

Methods and associated structures for rapidly processing messages in a distributed computing application. Rules are stored in structures defined by the present invention and methods associated therewith rapidly process the boolean predicates of the rules to determine what actions need be taken in the distributed computing environment in response to receipt of a message published by a publishing application in the distributed computing environment. Rules argument tables store rule argument entries which each represent a single boolean predicate test clause which compare a column (field) of a published message with either a fixed value or with another column of a published message. All rule argument predicate clauses which are AND'ed to form a rule are related in the rules argument tables by a common rule_id column value. An operations table stores entries each of which describes groups of attributes of rules stored in the rules argument tables. Rather than evaluating all rules against a received message as is known in the prior art, the tables of the present invention are searched using indexed random search methods to rapidly locate only those rule arguments (predicate clauses) which are applicable to the received message. The present invention thereby rapidly locates and evaluates all rules which are applicable to a particular published message without need to locate or evaluate other unrelated rules.

31 Claims, 8 Drawing Sheets

METHOD FOR DEFINING AND APPLYING RULES FOR MESSAGE DISTRIBUTION FOR TRANSACTION PROCESSING IN A DISTRIBUTED APPLICATION

FIELD OF THE INVENTION

The present invention relates to message communication subsystems in a distributed computing environment and in particular to a rule based anonymous message publisher/subscriber subsystem for distributing messages among cooperating tasks in a distributed computing application.

PROBLEM

A large class of data processing applications combines database and distributed computing paradigms to permit physically remote users to process transactions in a database while distributing the computing loads over a network of data processing systems. Such applications also serve to decouple application processes within a single data processing system. It is typical in such applications that messages are transmitted between the various nodes or processes in such a distributed computing application. These messages are used to synchronize and maintain the integrity of the data distributed among the nodes of the distributed computing environment or to direct processing to the appropriate distributed node or process.

In such a distributed environment, it is necessary for a sending node which has generated a message for transmission (a publisher) to determine which other nodes in the network are to receive the message (subscribers). The receiving nodes or processes which should receive the generated message (subscribers) may depend upon a number of varying factors, such as: the type of the message to be sent, the information content of the message or portions of the message, the information desired at each other remote node, the number of such other remote nodes, etc. Each of these factors may change dynamically as the distributed application operates and as the network upon which it operate grows or shrinks.

It is a problem for such distributed applications to maintain, in a flexible manner, information regarding which nodes or processes (subscribers) need to receive a particular message and in what form the subscribers require the message be received. This information is referred to herein as message routing information. If, for example, each application maintains its own static tables of message routing information, then each application may require change as the needs for the distributed application change or as the topology of the network hosting the application changes. It is therefore known to permit such changes to be made in a flexible manner by, for example, defining rules for determining the subscribers for a particular message. Rules may be defined using boolean logic to construct boolean predicates for evaluating the message (based upon comparisons of the message type and content) and to thereby determine the nodes or processes which subscribe to each particular published message and any required permutation or reformatting of the message required by each subscriber. For example, complex boolean logical predicate rules may be defined as logical combinations of tests applied to the fields of a message. Based upon the boolean results of evaluating the predicate, the message may or may not be distributed to a particular node or process which corresponds to the predicate rule.

However, it is a problem for current message distribution subsystems to maintain high throughput when the number of such rules grows very large. In current rule based message distribution systems, each rule may be inspected and evaluated to determine its applicability to the published message. For example, in a financial/securities exchange and analysis distributed application, a plurality of financial analysts may perform different analyses based upon financial and securities transactions recorded in a shared (distributed) database. Each analysis application may require receipt of messages pertaining to certain types of transactions or certain content but not other types or content. In large, international networks with such distributed applications for trading and analysis, there may be hundred of thousands of rules to be evaluated seriatim to determine whether the published message should be forwarded to each of hundreds or thousands of analysis applications and nodes.

It is apparent from the above discussion that a need exists for improving the capabilities for transaction processing application programs to create and maintain message routing, processing, and formatting information in a flexible manner.

SOLUTION

The present invention solves the above identified, and other, problems by providing a system and methods with associated structure in a distributed transaction processing computing environment for defining and rapidly applying rules which, when applied, dynamically determine which processes should receive a particular message generated by a process in the distributed application. As used herein, the term process or processes is used to refer generally to distributed portions of the distributed application. The distributed portions may reside within the same physical computing device or may be distributed across the nodes of a computing network of distinct computing devices. As used herein a process refers to any such distributed computing model regardless of the physical location of the message publisher and message subscriber. In particular, messages generated by a process in the network are said to be published by a publishing process. Messages are received by processes which require the message for transaction processing. Such receiving nodes are also referred to herein as subscriber or subscribing processes or nodes. The subscriber processes which receive a published message are defined by application of rules at the publishing process (or at a centralized publication server as desired by the administrators). Rules are associated with each subscribing process (e.g., application) on the network to define transaction messages which are to be received by that process, i.e., messages to which that process wishes to subscribe and any required permutations thereon. The rules are stored in a manner accessible to all processes in the network and are represented as boolean predicate expressions which evaluate to true with respect to a received message if the corresponding process wishes to subscribe to such messages.

The improvements of the present invention comprise methods and structures which permit rapid access to only those rules which are applicable to a particular received, published message based upon the information content of the received message. Prior rules based approaches inspected each rule to determine if its boolean logic predicates apply to the presently received message. Instead, the present invention stores the individual boolean comparison tests which, in combination using boolean logical predicates, form the rules defining subscription to messages by particular receiving processes (or any other desired action). The individual boolean comparison tests are referred to herein as rules arguments. The rules arguments are stored in such a manner as to be searchable based upon parameters easily derived from constituent parts of a received message. These parameters are derived from the information content of the message by parsing the message in order to derive the parameters in a pre-defined canonical format. The methods of the present invention therefore parse the published message into its constituent parts based upon which columns of the message have any rules (rules arguments) defined therefor. Random search techniques (e.g., indexed, keyed, or other well known search methods) are then applied to rapidly locate rules that are properly applicable to evaluation with respect to the particular published message instance and the information content therein. The random search techniques are substantially insensitive to the number of rules defined and a large number of rules may thus be rapidly searched. For example, if there are a million rules for specific types of actions/subscriptions for a type of published message, of which only five specifically relate to the particular published message instance, then only those five rules will be evaluated by the methods and structures of the present invention rather than the entire million rules as in prior methods. This technique is also referred to as an inverted search in the sense that the rules are searched based upon the content of a particular published message instance. Prior techniques determine applicability of rules, essentially, by applying each rule to evaluate its boolean truth value.

The methods and structures of the present invention may therefore be applicable to message routing, duplication, replication, formatting, and propagation in distributed transaction processing applications. In addition, the present invention may be applied to other rules based logic evaluation applications including, for example, expert systems for diagnosis or control applications.

Specifically, defined rules are decomposed into their respective predicate clauses (combinations of AND'ed terms and OR'ed predicates also referred to herein as rules arguments) and stored in a rules argument table. Entries in the rules argument table define the type of published message to which they apply and the boolean logic terms which must evaluate to true for the corresponding published message to be forwarded to the associated subscribing process (e.g., application). The terms of the boolean expression represented by a rule may test the existence of, and/or value of, a field in a received published message or a field derived from the message by operation of the parser. The predicate terms may test for conditions including:

Presence of particular fields of interest in the message
Values of a field of the message as compared to discrete values or ranges
Values of a field of the message as compared to other fields
Predicate terms may be combined using AND and OR logical operations Each clause (predicate) of a rule is stored as an entry (row) in the rules argument table. A rule_id key field in the rules argument table identifies each rule clause as part of a uniquely identified rule statement. AND'ed terms of a predicate share a common rule_id field value to associate those clauses as part of the same rule. OR'ed clauses (predicates) are stored in the rules argument table with separate entries identified by a unique rule_id field. Any boolean rule statement may be reorganized into OR'ed clauses of AND'ed predicates (by application of DeMorgan's rule—well known to those of ordinary skill in the arts).

In accordance with the present invention, a second table stores entries used to rapidly locate all entries in the rules tables which may apply to the current message. In particular, entries of the second table (referred to herein as the operations table) contain columns which: identify the message type to which a group of rules argument table entries apply, identify the column of the message which the group of rules argument entries tests, the type of test (the operator), and the number of such entries which are associated with the particular predicate of the identified rule. The operations table is then searched by standard search techniques to locate any rule predicates which may apply to the presently received, published message instance based upon the value of predicate column in the message instance to be evaluated.

In response to receipt of a published message, the operations table is searched using the message type as a key to determine which entries in the rules argument tables are potentially applicable to the particular published message instance. The operations table entries which correspond to the received, published message type are then evaluated to determine which comparison operations may evaluate to boolean true based upon the content of the received published message instance. A key comprising the message type, columns and values from the published message instance to be compared, and the type of comparison operator is then constructed and used to rapidly search the rules argument tables using indexed random search techniques. Only those rule predicates in the rules argument table which apply to the presently received, published message need be retrieved from the rules argument tables and evaluated. This method of the present invention therefore retrieves only those rules which are known to match the particular published messages instance's message type and column/field values. This dramatically decreases the number of rule predicates which need be evaluated in comparison with prior methods which evaluate all rules in their rules tables upon receipt of a published message or methods which merely reduce the number of rules to be searched (e.g., by application of heuristic techniques).

Each rule predicate in the rules argument table which may apply to the present published message (as located by rapid indexed search under control of the operations table) is then evaluated to determine its boolean truth value. An AND'ing table entry is created for each rule which has predicates applicable to the particular published message instance. A rule ID field associates the AND'ing table entry with a particular rule. For each predicate that evaluates to a boolean true value, a count column in each AND'ing table row is updated to reflect the number of AND'ed predicates which evaluated to boolean true for each unique rule_id associated with the evaluated predicates and with the AND'ing table row. After evaluating all applicable predicates, the count column in each AND'ing table row is compared to a cardinality column value in the rules argument table entry corresponding to the rule_id of each AND'ing table entry. The cardinality value indicates the number of boolean clauses (rules arguments) which are AND'ed to form the rule identified by the rule_id field of the rules arguments entries. If the cardinality value matches the count value, then the rule is said to be "triggered" (e.g. all AND'ed rules arguments of a rule evaluated to boolean true). In this manner, complex rules are evaluated to determine their boolean truth value without concern for which, if any, of the rule's predicate terms is false. The rule is said to trigger only if the total count of true predicate clauses (rules arguments) matches the cardinality value of the rule.

In an action table entry, all rules are associated with an action to be performed if the rule is triggered by a particular published message instance. When rules are determined to be triggered, they are added to a table of triggered rules for further processing. The action corresponding to each triggered rule is then performed. A sequence field is associated with each action so that multiple actions may be performed in a desired order in accordance with the sequence field values. A typical action describes the transmission of the published message to a subscriber application or process. However, an action may identify any type of action including starting/stopping and spawning/destroying other tasks, applications, systems, subsystems, networks, etc. in response to the publication of a particular message instance.

The above and other objects, aspects, features, and advantages of the present invention will become apparent from the following description and the attached drawing.

DETAILED DESCRIPTION OF THE INVENTION

While the invention is susceptible to various modifications and alternative forms, a specific embodiment thereof has been shown by way of example in the drawings and will be described in detail herein. It should be understood, however, that it is not intended to limit the invention to the particular form disclosed, but on the contrary, the invention is to cover all modifications, equivalents, and alternatives falling within the spirit and scope of the invention as defined by the appended claims.

DISTRIBUTED APPLICATIONS—OVERVIEW

Figure 1:
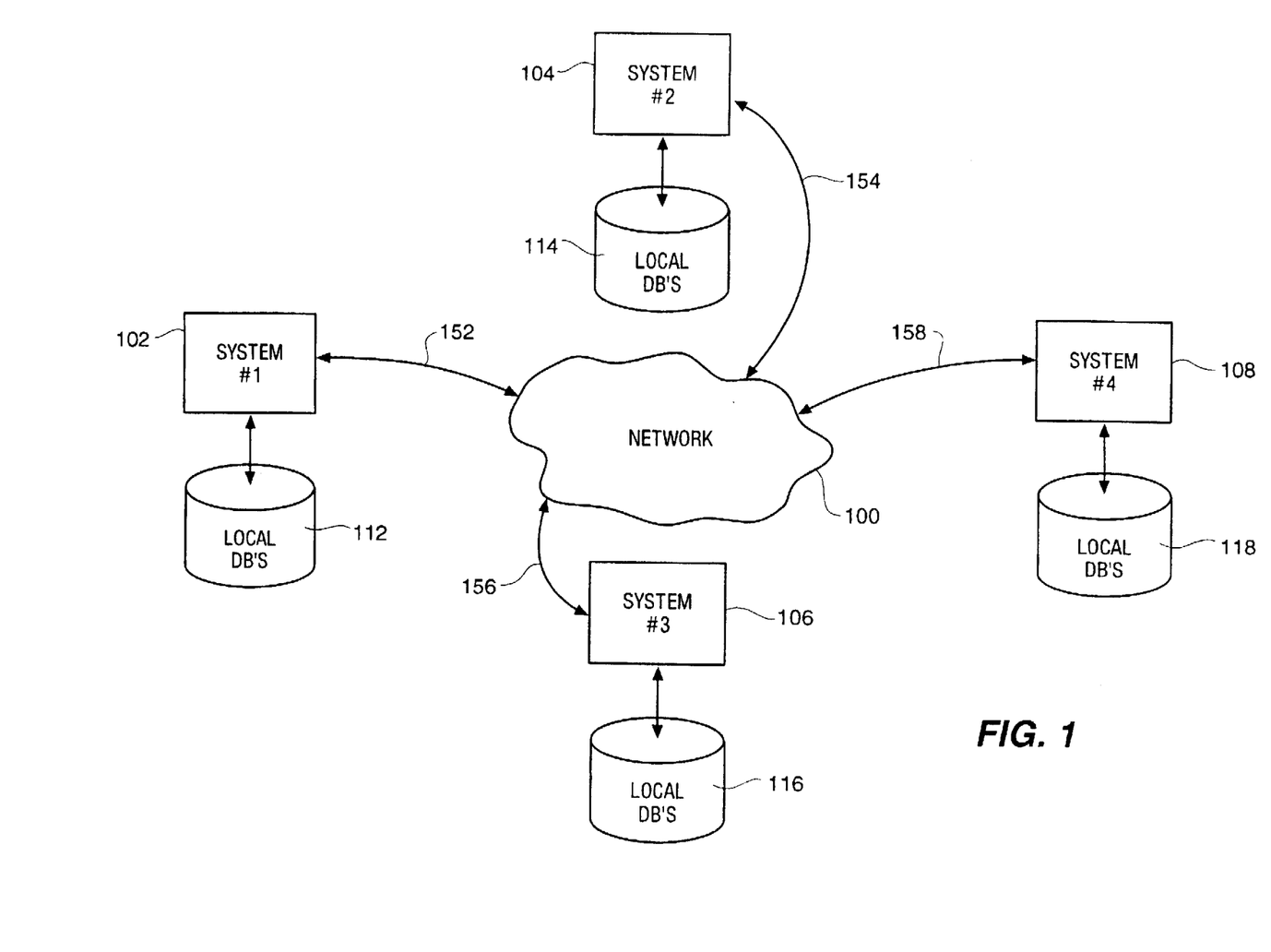
FIG. 1 is a block diagram of a distributed computing environment in which distributed applications may utilize the methods and structures of the present invention.

FIG. 1 is a block diagram depicting the typical distributed computing application environment in which a plurality of systems (nodes or processes operable within one or more nodes) communicate via a common network. Specifically, system #1, 102, system #2, 104, system #3, 106, and system #4, 108, each communicate with one another via network 100. Each system is connected to network 100 via its own unique network interface 152–158, respectively. In addition, each system 102–108 has access to its own local databases and storage 112–118, respectively, for rapid access to frequently used information. In this distributed computing environment, each system 102–108 may communicate information regarding its operation to any other system 102–108 in the distributing computing environment by transmitting messages through network 100. In addition, each system 102–108 may retrieve and store information on other systems 102–108 of the distributed computing environment by transmission of messages through network 100. In such a distributed computing environment, a complex application program may be distributed as required among any or all of the systems 102–108 in the distributed computing environment. Such a distributing computing environment paradigm is well known to those of ordinary skill in the art and need not be discussed further.

As noted above, the term process or processes as used herein refers to a distributed portion of the distributed application. Each distributed portion resides in, and is performed by, at least one of the plurality of computing systems as shown in FIG. 1. The methods of the present invention are therefore operable in conjunction with distributed computing configurations including a single computing system in which a distributed application operates as well as a computing network comprised of a plurality of interconnected computing systems having a distributed application operably distributed therein.

Transaction processing applications are one common class of distributed applications operable in the distributing computing environment depicted in FIG. 1. Transaction processing applications typically manipulate data throughout an enterprise that may be distributed in a plurality of cities or even a plurality of countries across the globe. Such applications have needs for manipulating common data and at the same time, have needs for rapid transaction response at each of the local distributed nodes. To achieve both goals, it is common to use distributed computing techniques in the transaction processing application to maintain consistent centralized data available to all processes while distributing and maintaining remote copies of frequently used data. When transactions are processed in such applications, messages are sent to appropriate processes in the distributed computing environment. The process which originated the message may or may not require knowledge of the completion or occurrence of the transaction.

The generation, transmission, and reception of such messages in a transaction processing application where the creator of the transaction message does not need to know the details regarding each subscribing receiver nor even the existence of each subscribing receiver, is also referred to in the industry as an anonymous publishing/subscribing model of message communication. An application which generates a transaction may be said to publish a message to be distributed through the network to any subscribing processes. In a more general sense, a subscribing process may simply be another application program running either within the same node as the publishing application or on a remote node accessible through the network. There may be zero or more subscribing processes (e.g., applications) throughout the distributed computing environment corresponding to any particular published message instance generated by a publishing application. To maintain high transaction processing rates, it is necessary to determine quickly which subscribing processes/applications need to receive a published message. Current techniques available in the marketplace utilize database management techniques or other indexing and search techniques to determine the subscribing processes/applications which require knowledge of a published message.

To permit significant flexibility to users in a transaction processing distributed computing environment, the subscription information is frequently defined by rules incorporating boolean logic to evaluate the contents of a message and thereby determine which applications subscribe to a particular generated message. A publisher/subscriber database therefore contains a large number of rules identifying which transaction messages published by an application in the distributed computing environment are to be transmitted to which subscribing processes/applications. Searching such a database can be extremely time consuming. It is not uncommon for a rules database to contain hundreds of thousands of entries in complex transaction processing distributed computing environments.

Exemplary complex applications requiring a publishing/subscribing model in transaction processing include: financial securities and exchange transaction processing, ticketing applications, and warehousing/distribution applications. For example, in the financial securities and exchange application domain, a single securities transaction may be distributed to zero or more subscribing processes/applications depending upon the particular security involved, the volumes of the transaction, the trading parties, downstream clearance, settlement or hedging, or any combination of those fields and other parameters. Each subscribing process/application may require knowledge of certain transactions but not others depending upon its analysis needs. Subscribing processes/applications may represent, for example, a financial and securities analysis function for determining a financial response to another financial transaction. A collection of rules describing the subscribers for transactions relating to thousands of securities wherein each application requires different information to perform its appointed analysis, may require hundreds of thousands of rules to be defined and searched for each published message generated in the application. Evaluation of such complex rules without the aid of the present invention can become a severe limiting factor in the total transaction processing speed of the distributed application.

IMPROVEMENTS OF THE PRESENT INVENTION

Figure 2:
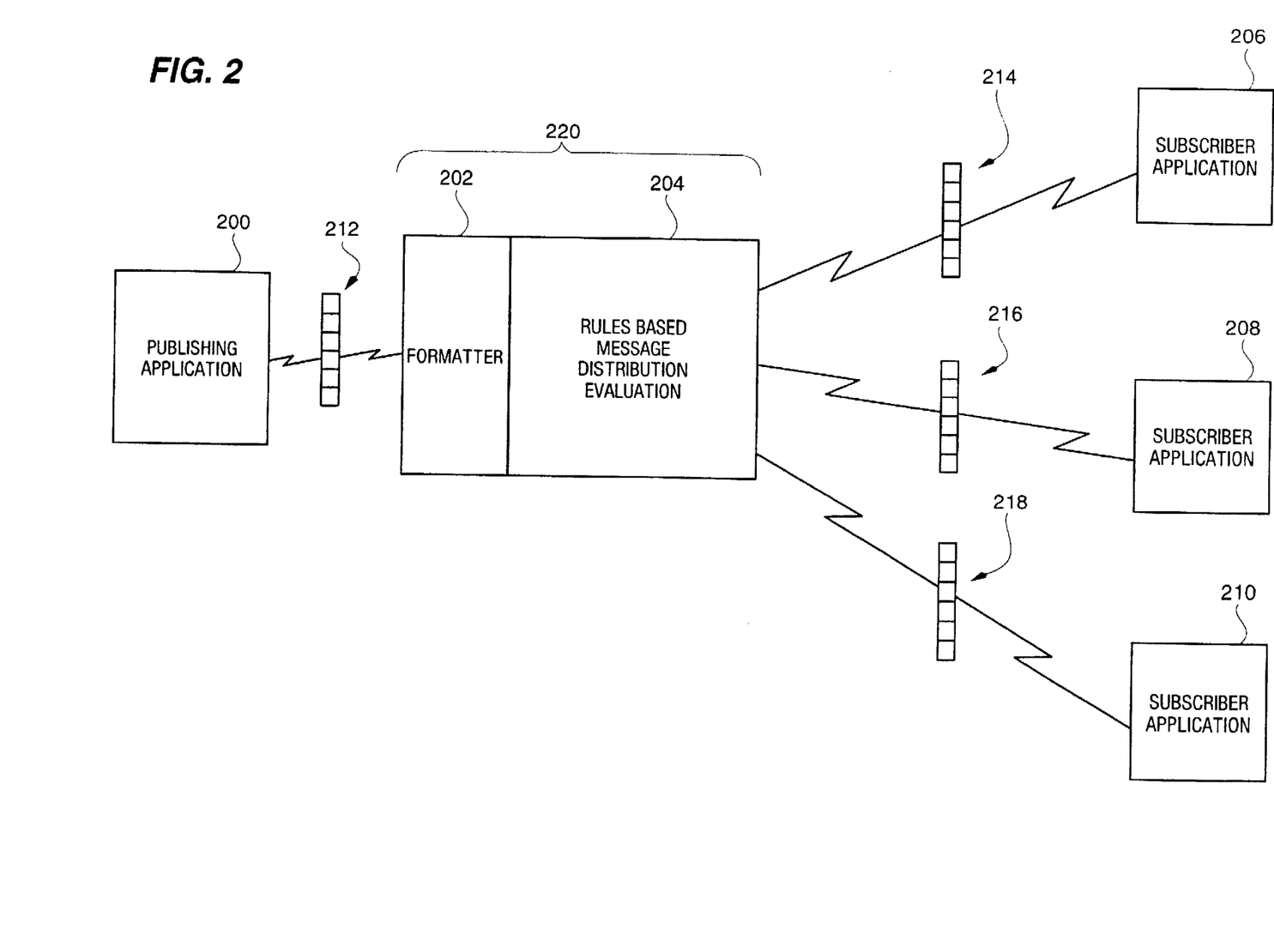
FIG. 2 is a block diagram depicting a typical message routing application of the present invention to distribute a published message from a publishing application to one or more subscribing processes/applications by rules based methods in accordance with the present invention.

FIG. 2 is a block diagram describing the context in which the enhanced processing techniques of the present invention are operable to maintain high transaction processing rates while permitting significant flexibility in the definition of rules for the publishing/subscribing model of message processing. A publishing application 200 publishes messages and transmits them through queue 212 to a subscriber distribution element 220. The subscriber distribution element 220 is comprised of a dynamic message reformatter 202 (a parser to extract information from a received message) and the rules based message distribution evaluation technique 204. Each published message is evaluated rapidly by the processing of elements 202 and 204 and is transmitted to all subscribing processes/applications as depicted in FIG. 2 including application 206 via queue 214, application 208 via queue 216, and application 210 via queue 218. Based upon the rules evaluation performed by element 204, each published message may be distributed to zero or more subscribing processes/applications.

RULES EVALUATION—TABLES

Figure 3:
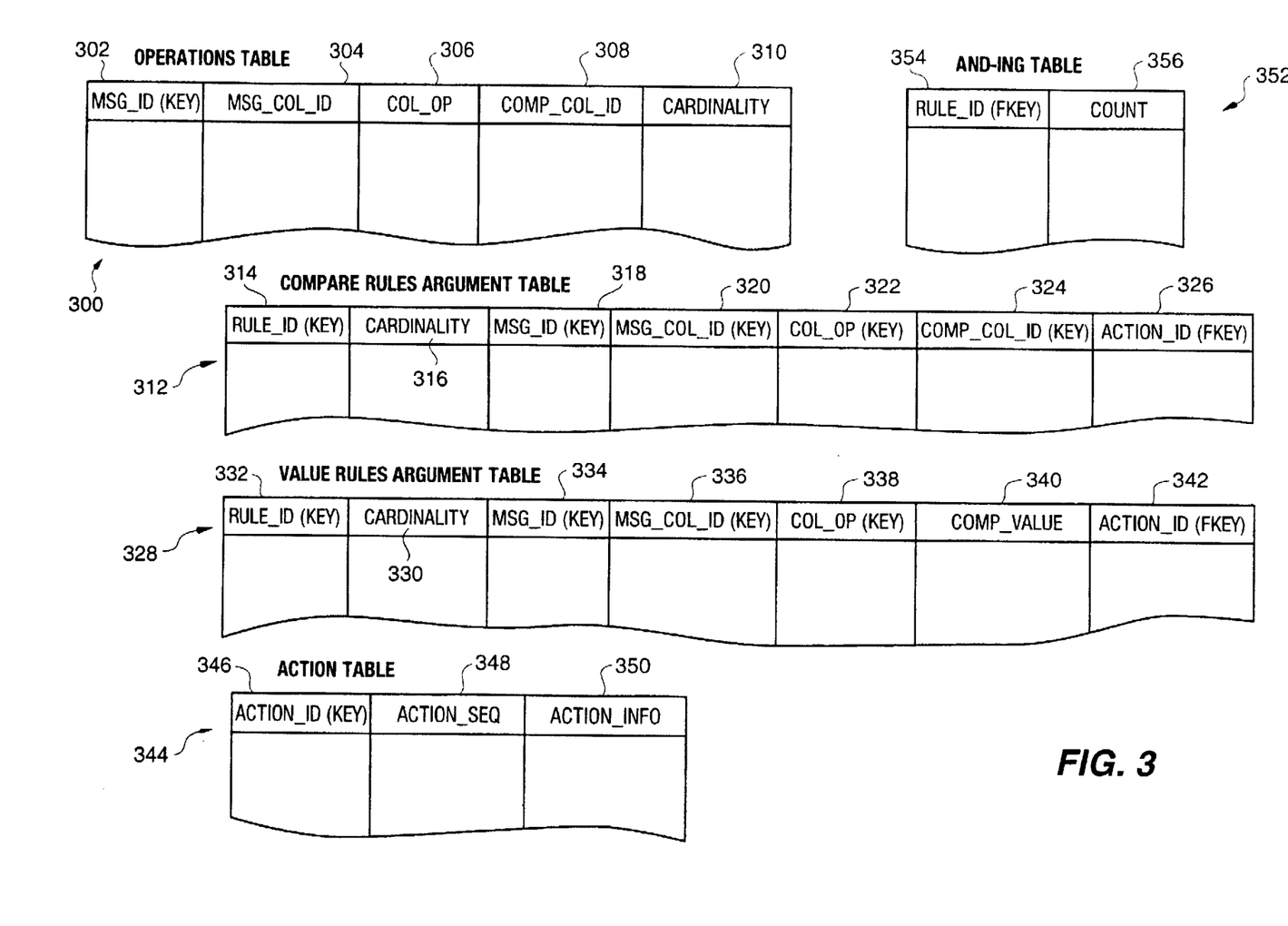
FIG. 3 depicts an exemplary structure of tables used by the methods of the present invention to store and rapidly search and retrieve boolean rule predicate clauses which determine actions to be taken in response to receipt of a message.

The rules evaluation processing of element 204 utilizes a number of tables to describe and evaluate the rules for the publishing/subscribing model. FIG. 3 is a schematic depiction of the tables utilized by the processing of element 204. It will be readily recognized by those of ordinary skill in the art that the table structures depicted in FIG. 3 are intended only as exemplary of data structures which may be utilized by the methods of the present invention discussed below. Equivalent information may be stored and normalized in many equivalent data structures to provide for application of the rules evaluation methods of the present invention.

Columns in the tables of FIG. 3 typically used to rapidly search the associated tables are labeled with the "KEY" label to indicate that the column is used for indexed searching techniques. Columns labeled "FKEY" represent foreign keys: a column in the associated table used to relate (join) entries in another table by a key column in the other table. As noted above, the representation of particular columns as key columns is intended as exemplary of one possible implementation of the structures of the present invention useful in conjunction with the methods of the present invention. Many other equivalent structures and schemas are encompassed within the scope of the present claimed invention.

The compare rules argument table 312 and the value rules argument table 328 both contain descriptions rules arguments (boolean comparison operations) of rules of the transaction processing distributed computing environment application. The rules may be predefined by user inputs which define the desired actions in response to receipt of a particular published message instance. Rules may also be generated automatically by the methods of the present invention as messages are published for transmission to subscribing processes. Each rule corresponds to a subscription of a particular type of class of published messages by another application (or more generally to an action taken in response to publication of a particular message). Each AND'ed clause (predicate) of a rule is stored as an entry (row) of the rules argument tables. Each clause is associated with a particular rule by the rule_id column value. OR'ed clauses are simply added to the tables as additional uniquely identified rules. Each row in the compare rules argument table corresponds to one logically AND'ed clause (boolean predicate) of a boolean logical rule defined by a subscribing process/application (or action). The entries in compare rules argument table 312 describe clauses of subscription rules which involve a comparison of one column (field) of a published message with another column (field) of a published message. The rows or entries in value rules argument table 328 describe clauses of boolean logic rules for subscription which involve the comparison of a column (field) of a published message with a constant value.

The rule_id column (314 of table 312 and 330 of table 328) is a key value field which serves to relate all clauses of a particular subscription rule. In other words, every AND'ed clause of a particular subscription rule will have a common rule_id key field. The cardinality column (316 of table 312 and 332 of table 328) indicates the number of AND'ed clauses which comprise the entire rule (e.g. the number of entries in the compare rules table argument 312 and the value rules argument rules 328 which have an identical rule_id key value). The msg_id column (318 of table 312 and 334 of table 328) indicates the type of published message to which the rule clause applies. This value uniquely identifies the message type of a published message to which this subscription rule is applied. The rule clause is ignored for any published messages which do not have a msg_id field value corresponding to the msg_id field of the rules argument table entry. The msg_col_id column (320 of table 312 and 336 of table 328) indicates the field or column of the published message to which this rule clause entry is applied. Specifically, this column identifies which field or column of the published message is to be compared in evaluation of this entries rule clause. The col_op column (322 of table 312 and 338 of table 328) indicates the type of comparison operations to be performed in evaluating this entries rule clause. The types of operations performed include: "equal to", "greater than", "less than", "greater than or equal to", "less than or equal to", "not equal to", and other potential operators unique to particular data types. The particular data types and permissible comparison operations on those data types is dependent upon the particular database engine or other implementation paradigms upon which the methods of the present invention are constructed. One of ordinary skill in the art will readily recognize that the col_op column (322 of table 312 and 338 of table 328) is broadly intended to denote any and all comparison operations permissible within a particular computing environment. The comp_col_id column (324 of table 312) identifies the second identified column with which the first identified column (320 of table 312) is to be compared. The two identified columns are compared by application of the identified comparison operator (322 of table 312). The comp_value column (340 of table 328) identifies a constant value which is to be compared with the identified column (336 of table 328). The identified column or constant value are compared to the identified column value of the published message using the identified operator (338 of table 328). When the identified comparison is evaluated, if the evaluation results in a boolean TRUE, then the particular action identified by the action_id column (326 of table 312 and 342 of table 328) is to be performed if all AND'ed clauses evaluate to TRUE.

The action table 344 describes details of an identified action to be performed when all clauses of a rule evaluate to boolean TRUE. Each row of action table 344 corresponds to an action associated with a rule defined by the entries in compare rules argument table 312 and value rules argument table 328. Each row consists of an action_id column (346 of table 344) which uniquely identifies the action to be performed, an action_seq column (348 of table 344) which identifies the order in which multiple actions are to be performed. For example, a single published message instance may trigger several rules, each of which is defined to perform a specific action. A rule is said to be triggered if all AND'ed predicates of the rule evaluate to a boolean TRUE value. To assure that such a plurality of actions are performed in the desired order, "triggered" actions are added to a table and sorted in order of the action_seq column (348 of table 344) value. When the actions are eventually performed, the triggered actions will be performed in the desired order by sequencing through the sorted table entries. The action_info column (350 of table 344) identifies all of the information necessary to initiate the desired action specified by the users rule. The action_info column 350, for example, defines information required to send a transaction message to a subscribing process/application program. More generally, the action_info column (350 of table 344) may define any parameters to perform a desired action in response to a all the AND'ed clauses of a rule evaluating to boolean TRUE. Such actions may include initiating execution of a new application, terminating execution of an application, logging or recording information about the transaction in a file or database, etc. One of ordinary skill in the art will readily recognize that the action_info column (350 of table 344) may be broadly defined to include any action defined by the user's rule within the context of the distributed computing application described herein. For purposes of further discussion in this patent, it is presumed that action_info defines the parameters necessary to cause a published transaction message to be transmitted to a subscribing process/application program. These parameters may include an address/identification of a desired target computing process, an identification of a particular queue associated with the communication path to the target process, a name of a process, and an identification of a queue associated with the communications in which a reply may be expected. In addition, format translation specification information may be included in the action_info column (350 of table 344) to identify a translation format to be used in transmitting the published message to a particular subscriber's desired format.

The AND'ing table 352 is used by the methods of the present invention to maintain a count of the number of AND'ed clauses for a particular rule_id which are evaluated to a boolean TRUE value. For each published message received, the methods of the present invention determine through use of the operations table 300 which rule clauses, stored in compare rules argument table 312 and value rules argument table 328, may be applicable to the received published messages. Only those potentially applicable rule clauses will be evaluated as discussed below. For each rule_id associated with the potentially applicable rule clauses, an entry is placed in the AND'ing table 352 to identify the number of clauses of a particular rule_id which have evaluated to a boolean TRUE value. After all potentially applicable rule clauses are evaluated, the AND'ing table 352 entries will identify the number of clauses for each applicable rule_id which evaluated to TRUE. If the count so determined matched the cardinality (310 of table 300) of the rule as stored in the operations table 300 or the rules argument tables 312 and 328, then the action table entry associated with the rule_id will be interrogated and the desired action performed (e.g. the published message is transmitted to a subscribing process/application). The rule_id column (354 of table 352) contains the identification information for the rule in which at least one of the AND'ed clauses evaluated to boolean TRUE. The count column (356 of table 352) indicates the count of the number of clauses for the associated rule_id which evaluated to boolean TRUE.

The entire AND'ing table 352 is emptied (initialized) at the beginning of processing for a new newly received published message. Entries are added to the AND'ing table 352 as potentially applicable rules are evaluated at the direction of the operations table 300. When all potentially applicable rules have been evaluated, the entries (rows) of the AND'ing table 352 are utilized to determine which rule_id's have an associated count column (356 or table 352) value indicative of all clauses of the rule having evaluated to boolean TRUE.

One of ordinary skill in the art will readily recognize that the tables depicted in FIG. 3 may be implemented in any of several equivalent data structures within storage and memory of a computer system. Specifically, the tables may be implemented utilizing relational database management system (RDBMS) technologies well known to those of ordinary skill in the art. Alternatively, the data structures depicted in FIG. 3 may be implemented utilizing any systems or structures which permit rapid searching of the depicted tables including, for example, well known binary search mechanisms, hashing and bit mapped lookup mechanisms, and various well known tree data structure search methods. Many such equivalent programming techniques and data structures are to be considered within the scope of protection of the present invention.

RULES EVALUATION—METHODS

Figure 4:
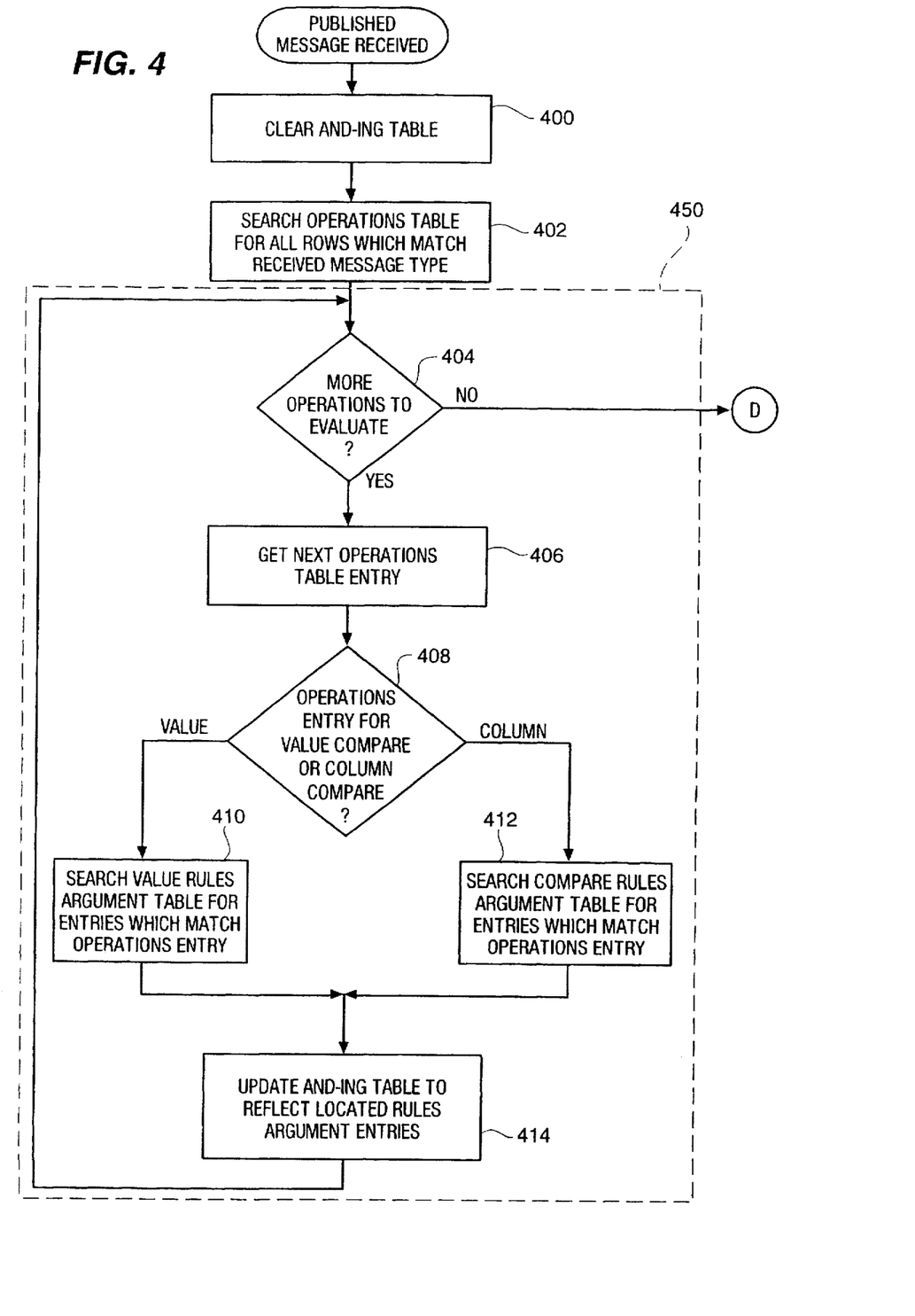
FIG. 4 is a flowchart describing the methods of the present invention which utilize the table structures of FIG. 3 to determine the desired action based upon boolean rule evaluation in response to a received message.
Figure 5:
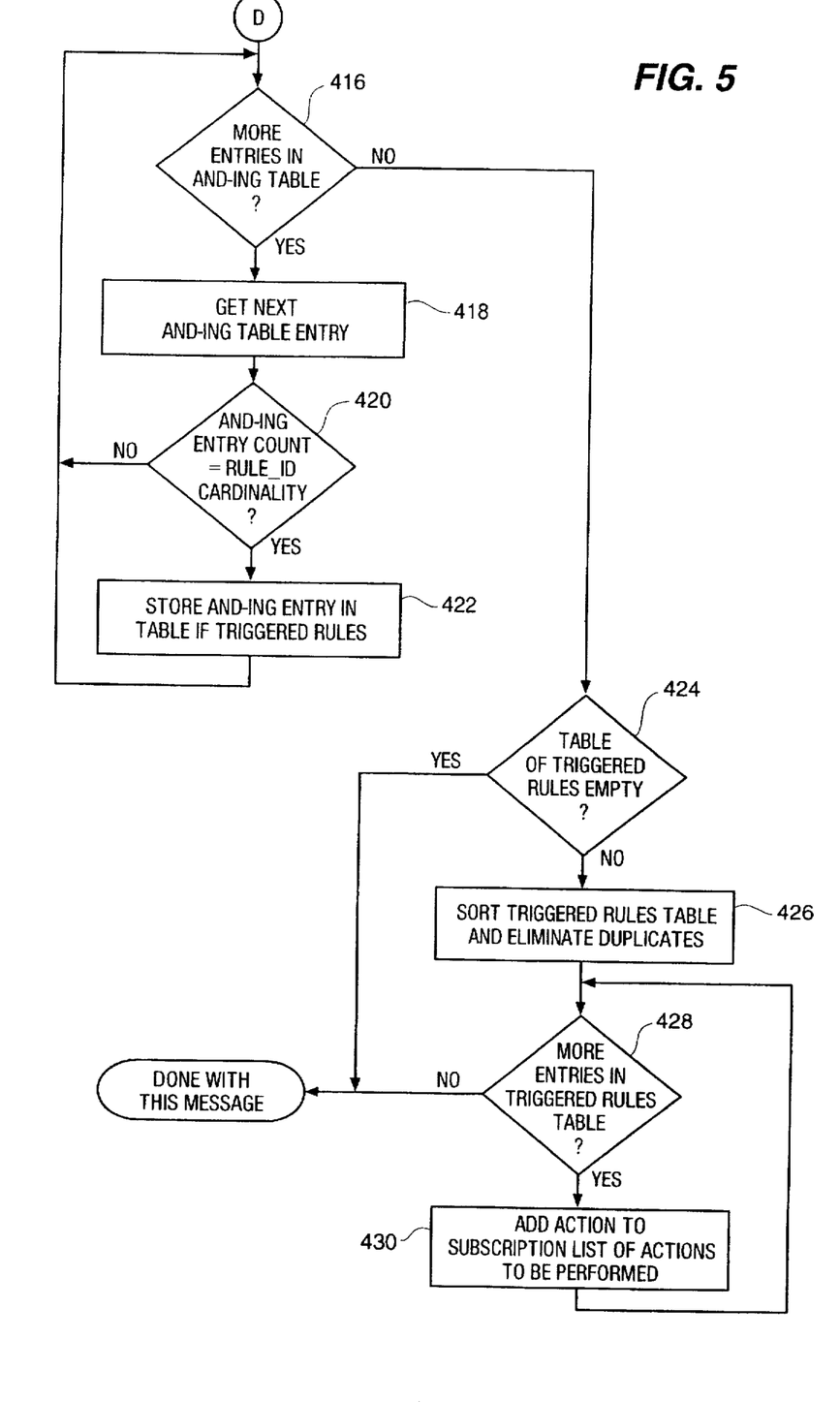
FIG. 5 is a flowchart further describing the methods of the present invention which utilize the table structures of FIG. 3 to determine the desired action based upon boolean rule evaluation in response to a received message.

FIGS. 4 and 5 together depict the methods of the present invention which process published messages to distribute them to subscribing process/application programs. The methods are operable within a computing system (102–108 of FIG. 1) on which the published message is generated, or may be operable through distributed computing techniques at any computing process within the distributed computing environment as depicted in FIG. 1. In particular, it may be desirable in certain applications to include a server node dedicated to the function of processing published messages for purposes of re-distribution throughout the distributed computing environment, or for other processing as discussed below. The methods depicted in the flowcharts of FIGS. 4 and 5 are initiated by the receipt of a published message at a computing system 102–108 on which the methods are operable.

Element 400 of FIG. 4 is first operable to clear all entries (rows) of the AND'ing table 352 of FIG. 3. The AND'ing table, as noted above, is used to record interim results as the various operations table entries and rules argument table entries are inspected and evaluated according to the method discussed below. Each published message received by the method of the present invention includes a message identification or type field. Element 402 is then operable to search the operations table 300 of FIG. 3. As noted above, operations table 300 (as any of the tables noted in FIG. 3) may be searched by any of several well known indexing and searching techniques. Element 402 is therefore operable to search the operations table 300 for all entries which relate to the received published message.

Elements 404–414 are next operable repetitively to process each of the entries (rows) which were located by operation of element 402 above. Each row or entry located by operation of element 402 provides key values useful for rapidly locating entries in the rules argument tables 312 and 328 of FIG. 3. Element 404 is first operable to determine if additional entries located in the operations table 300 remain to be processed by iterative operation of element 404–414. If no further operations table entries remain to be processed, processing continues at label D with element 416 of FIG. 5.

For each operations table entry, element 406 is next operable to retrieve the information from the located operations table 300 entry. One of ordinary skill in the art will readily recognize that the entries (rows) located by operation of element 402 and retrieved by operation of element 406 may be placed in a high speed (cache) memory to improve performance in the analysis and evaluation of published messages. Element 408 is then operable to determine whether the col_op column 306 of the operations table 300 requires comparison of a column in the published message against a fixed value or comparison against another column of the published message. Element 410 is operable to search the value rules argument table 312 for all entries which match the located and retrieved operations table 300 entry with respect to all identified key values. Specifically, element 410 performs searches on the value rules argument table 328 of FIG. 300 to locate all entries where the msg_id column 334 matches the msg_id column 302 of the located and retrieved operations table 300 entry, and where the msg_col_id column 336 matches the msg_col_id column 304, etc. Details of the operation of element 410 are discussed below with reference to FIG. 6. In a similar manner, element 412 of FIG. 4 is operable to search the compare rules argument table 312 of FIG. 3 for any rule clause entries whose column values match the column values of the located and retrieved operations table 300 entry. As noted above with respect to element 410, columns which are common between the operations table 300 and the compare rules argument table 312 are located by any of several well known search techniques to identify entries in the compare rules argument table 312 which relate to tests applicable to the published message.

Following operation of either element 410 to search value rules argument table 328 or element 412 to search compare rules argument table 312, element 414 is next operable to update the AND'ing table 352 of FIG. 3 to reflect the applicable rule clauses located in both the compare rules argument table 312 and the value rules argument table 328. As noted above with respect to FIG. 3, the AND'ing table 352 is used to record the number of rules clauses (rule arguments) which are located by the searching performed by elements 410 and 412 of FIG. 4. An entire rule is stored and identified by entries in the rules argument tables 312 and 328 of FIG. 3 containing common rule_id column values (columns 314 of table 312 and 330 of table 328). Each rule argument entry corresponds to an AND'ed clause of the entire rule. The AND'ing table 352 is therefore used to maintain a count of the number of rules argument table entries (AND'ed clauses) which are evaluated to a boolean TRUE value by operation of elements 410 and 412. Details of the operation of element 414 to update the AND'ing table are discussed below with respect to FIG. 8.

Elements 404–414 are therefore operable to locate and evaluate all rules argument entries from the rules argument tables 312 and 328 which evaluate boolean TRUE with respect to the received published message. When all possible rules clauses have been so located and retrieved, element 404 continues operation at label D with element 416 of FIG. 5 to determine which rules have been "triggered."

The search methods of the present invention are well adapted for performance enhancement by use of parallel processing techniques. A plurality of parallel processes, operable on a plurality of parallel data processing devices (e.g., a superscalar parallel architecture), may perform searches in parallel for different portions of the particular published message instance. A first process may search for rules applicable to a first column of a particular published message instance while a second process searches for rules applicable to a second column of the same message instance. The dashed line box 450 of FIG. 4 indicates a portion of the methods which are easily adapted for such parallel processing techniques. Prior methods are not as easily adapted for such parallel processing techniques. Once the parallel searches have completed by creating the various AND'ing table entries, a single processor would then continue as discussed below to process the entries in the AND'ing table to determine associated actions which should be performed.

Referring now to FIG. 5, element 416–422 are next operable iteratively to evaluate each entry in AND'ing table 352. Each AND'ing table 352 entry identifies the count of AND'ed clauses which evaluated to a boolean TRUE value for the associated rule_id. Element 416 is operable to determine whether all AND'ing table 352 entries have been processed by elements 416–422. If no further entries remain to be processed, element 416 continues operation with element 424 discussed below. For each AND'ing table entry to be processed, element 418 is next operable to retrieve the AND'ing table entry from AND'ing table 352. One of ordinary skill in the art will readily recognize that the entries of AND'ing table 352 may preferably be stored in a high speed (cache) memory to improve performance in evaluation the rules applicable to a received published message. Element 420 is next operable to test whether the count column (column 356 of table 352) value is equal to the cardinality column (316 of table 312 or 332 of table 328) value associated with the corresponding rule_id. Specifically, using the rule_id column value 354 of the AND'ing table 352 entry currently being processed, any entry in either compare rules table 312 or value rules argument table 328 containing the same rule_id key value (column 314 of table 312 or column 330 of table 328) may be retrieved to inspect the cardinality value (column 316 of table 312 or 332 of table 328) associated with the corresponding rule_id. If the AND'ing table count column value is not equal to the rule_id cardinality value, processing continues with element 406 and the rule is not "triggered." Conversely, if the AND'ing count column value is equal to the rule_id cardinality value then the rule is said to be "triggered" and processing continues with element 422 to store the corresponding rule_id of the triggered rule in a table of triggered rules. Processing then continues by looping back to element 416 to determine whether additional AND'ing table entries remain to be processed.

In response to element 416 determining that no further AND'ing table entries remain to be processed, element 424 is next operable to determine whether any rules evaluated by elements 416–422 above were triggered. If element 424 determines that the table of triggered rules is empty, processing of this received, published message is completed and no actions need be taken in response to receipt of this particular published message. If element 424 determines that the table of triggered rules is not empty, processing continues with element 426 to sort the table of triggered rules and to eliminate any duplicate entries therein.

The sorted table of triggered rules is then used in an iterative manner by elements 428 and 430 to perform the action associated with each triggered rule. Specifically, element 428 determines whether further entries remain to be processed in the sorted table of triggered rules. If no further entries remain to be processed, processing is completed for this received, published message and all actions associated with the triggered rules have been performed. Conversely, if more entries remain in the sorted triggered rules table, then processing continues with element 430 to perform the specified action associated with the triggered rule. An action associated with a triggered rule is identified by a unique action_id column value (column 326 of table 312, 342 of table 328, and 346 of action table 344). The action table 344 identifies the specific information related to the action to be performed. As noted above with respect to FIG. 2, a common application of the methods of the present invention is the transmission of a published message to all subscribing processes/applications or other subscribing functions running on one or more processes in a distributed computing environment.

Figure 6:
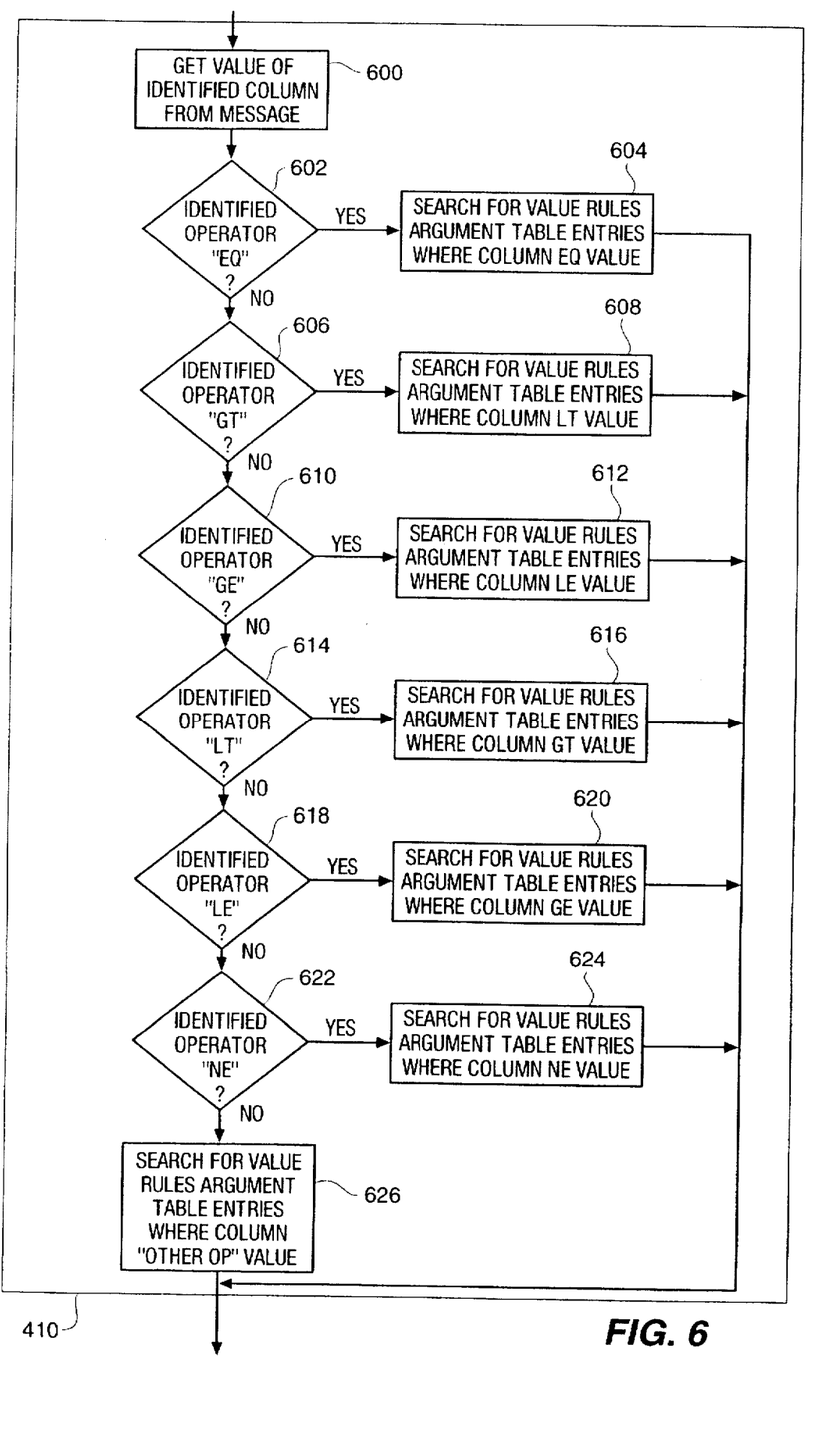
FIG. 6 is a flowchart describing additional details of the methods of the present invention shown in FIGS. 4 and 5.

FIG. 6 is a flowchart describing the operation of element 410 of FIG. 4 in additional detail. Element 410 of FIG. 4 is operable search the value rules argument table 328 to locate and evaluate all rule arguments (AND'ed clauses of a rule) which evaluate to a boolean TRUE value as applied to the received, published message. In particular, element 600 is first operable to get the value of the identified column from the message for purposes of comparison with a particular fixed value. Element 600 parses the received message to extract fields required for the rules evaluation. Element 600 therefore represents any processing required to extract information from the received message in a canonical form for use in locating applicable rules arguments and for evaluating the boolean truth thereof. A simple parsing technique, well known to those of ordinary skill in the art, may be used for purposes of element 600. Other embodiments may utilize more complex parsing methods which permit translation or reformatting of the information extracted from the received message. Any technique which is capable of extracting information from the received message in a predefined canonical form is useful in the methods of the present invention for processing in element 600.

Elements 602–604 are then operable to determine whether the column operator for comparison with the specified fixed value is an "EQ" operation (an "equal to" comparison operation). In addition, elements 602–604 determine whether the specified fixed value is in fact equal to the identified column value in the published message. Specifically, element 602 determines whether the comparison operator is an equal to operation. If element 602 determines that the identified operator is in fact equal to comparison, then element 604 is next operable to search for all entries (rows) in the value rules argument table 328 wherein the comparison comp_value column value 340 is equal to the value in the identified column (identified by the msg_col_id column 336 of table 328) in the received published message. The identified column value of the published message is retrieved for rapid comparison by operation of element 600 discussed above. Following the search operation of element 604 the located and retrieved records are then used in further processing by element 414 of FIG. 4 as discussed above. Processing of element 410 is then completed.

If element 602 determines that the identified operator in the operations table entry 300 is not an equal to comparison operator, then processing continues with element 606. Elements 606 and 608 are operable in a manner similar to that discussed above for element 602 and 604. Specifically, elements 606 and 608 are operable to locate records in the rules argument table 328 where the operator is a greater than comparison and for which the published message column value is less than the fixed value identified by the rule argument entry. Elements 610–612 are likewise operable to locate records where the operator is a greater than or equal to comparison and where the published message column value is less than or equal to the fixed value, elements 614–616 locate records wherein the operator is a less than comparison and wherein the published message column value is greater than the associated fixed value, elements 618–620 locate records wherein the operator is a less than or equal to comparison and wherein the published message column value is greater than or equal to the associated fixed value, and elements 622–624 locate all records wherein the published message column value is not equal to the identified fixed value.

As discussed above, the applicable operators may include other operators appropriate to particular data types in particular database management systems. Element 626 therefore represents all processing analogous to that described above in elements 602–624 for processing of any "other operation." Examples of such other operations may include comparison of values before and after some other event.

Upon completion of processing in element 410 as depicted in FIG. 6, all records (entries or rows) are located and retrieved from the value rules argument table 328 wherein the evaluation of the identified comparison operator (as performed by the search methods of elements 604, 608, 612, 616, 620, 624, and 626) results in a boolean TRUE value. The records so located and retrieved are then processed further by element 414 of FIG. 4, discussed in additional detail below with respect to FIG. 8, to enter the relevant data in the AND'ing table 352 of FIG. 3.

Figure 7:
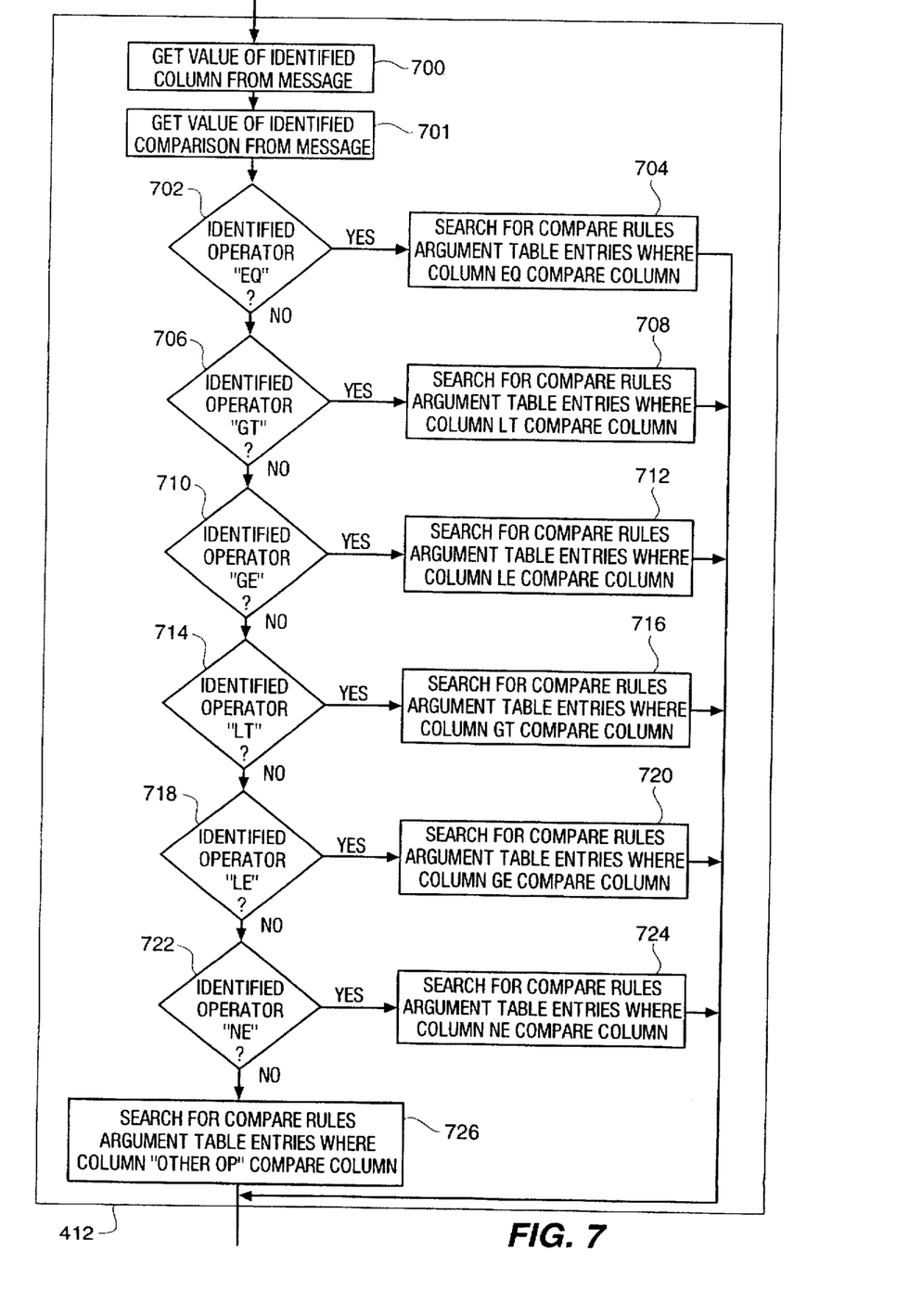
FIG. 7 is a flowchart describing additional details of the methods of the present invention shown in FIGS. 4 and 5.

FIG. 7 is a flowchart describing in additional detail the operation of element 412 of FIG. 4. Element 412 of FIG. 7 is operable in a manner similar to that described above for element 410 with respect to FIG. 6 but performs its searches in the compare rules argument table 312. Element 412 is operable to locate records in the compare rules argument table 312 of FIG. 3 wherein a particular identified column of the published message is compared with another (second) identified column in the published message according to the identified operator. Elements 700 and 701 are operable to retrieve the value of the identified first column and second column respectively. As discussed above with respect to element 600, many well known parsing techniques are applicable to simplify the processing in elements 700 and 701 by retrieving the identified column values in pre-defined canonical formats.

Following operation of elements 700 and 701 to retrieve the column values from the published message for comparison, elements 702-726 are operable in a manner analogous to elements 602-626 of FIG. 6. Specifically, elements 702-726 are operable with respect to entries in the compare rules argument table 312 of FIG. 3. The resulting records located and retrieved by operation of elements 702-726 of FIG. 7 are then further processed by element 414 of FIG. 4 to record relevant information in AND'ing table 352 of FIG. 3.

Specifically, elements 702-704 are operable to determine whether the column operator for comparison with the specified second column value is an "EQ" operation (an "equal to" comparison operation). In addition, elements 702-704 determine whether the specified second column value is in fact equal to the identified column value in the published message. Specifically, element 702 determines whether the comparison operator is an equal to operation. If element 702 determines that the identified operator is an equal to comparison, then element 704 is next operable to search for all entries (rows) in the compare rules argument table 312 wherein the message column value in the second column identified by the comp__col__id column value 324 is equal to the message value in the first identified column (identified by the msg__col__id column 320 of table 312). The first and second identified column values of the published message are retrieved for rapid comparison by operation of elements 700 and 701 discussed above. Following the search operation of element 704 the located and retrieved records are then used in further processing by element 414 of FIG. 4 as discussed above. Processing of element 412 is then completed.

If element 702 determines that the identified operator in the operations table entry 300 is not an equal to comparison operator, then processing continues with element 706. Elements 706 and 708 are operable in a manner similar to that discussed above for element 702 and 704. Specifically, elements 706 and 708 are operable to locate records in the compare rules argument table 312 where the operator is a greater than comparison and for which the published message first identified column value is less than the second identified column value. Elements 710-712 are likewise operable to locate records where the operator is a greater than or equal to comparison and where the published message first identified column value is less than or equal to the second identified column value, elements 714-716 locate records wherein the operator is a less than comparison and wherein the published message first identified column value is greater than the second identified column value, elements 718-720 locate records wherein the operator is a less than or equal to comparison and wherein the published message first identified column value is greater than or equal to the second identified column value, and elements 722-724 locate all records wherein the published message first identified column value is not equal to the second identified column value.

As discussed above, the applicable operators may include other operators appropriate to particular data types in particular database management systems. Element 726 therefore represents all processing analogous to that described above in elements 702-724 for processing of any "other operation." Examples of such other operations may include comparison of values before and after some other event.

Upon completion of processing in element 412 as depicted in FIG. 7, all records (entries or rows) are located and retrieved from the compare rules argument table 312 wherein the evaluation of the identified comparison operator (as performed by the search methods of elements 704, 708, 712, 716, 720, 724, and 726) results in a boolean TRUE value. The records so located and retrieved are then processed further by element 414 of FIG. 4, discussed in additional detail below with respect to FIG. 8, to enter the relevant data in the AND'ing table 352 of FIG. 3.

Figure 8:
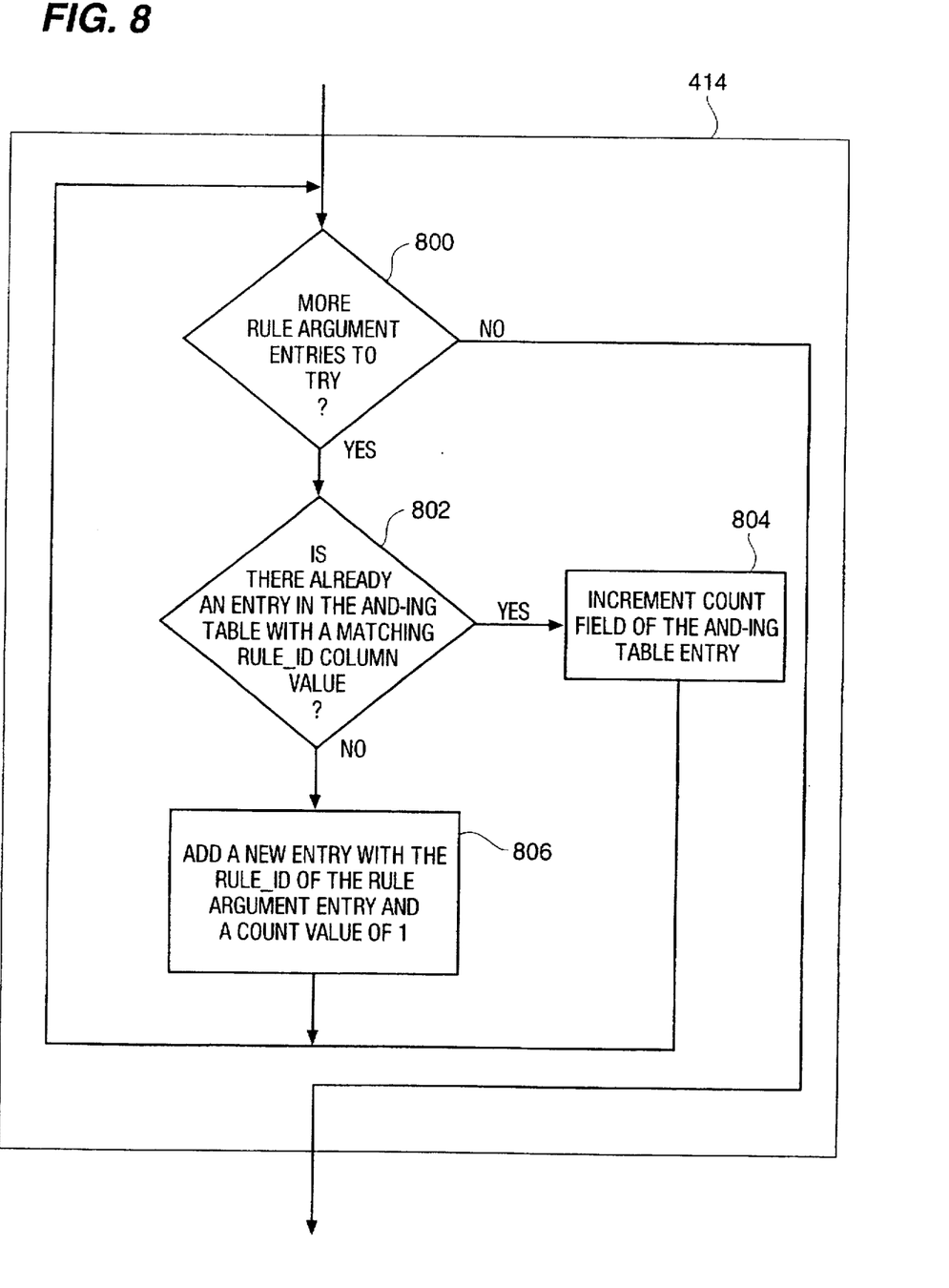
FIG. 8 is a flowchart describing additional details of the methods of the present invention shown in FIGS. 4 and 5.

FIG. 8 is a flowchart describing the operation of element 414 of FIG. 4 in additional detail. Element 414 of FIG. 4 is operable to generate and store information in AND'ing table 352. The stored information is extracted and derived from the records located and retrieved from compare rules argument table 312 and value rules argument table 328 by operation of elements 410 and 412 of FIG. 4 as discussed above. Element 800 is first operable to determine whether additional entries located and retrieved from compare rules argument table 312 or value rules argument table 328 remain to be processed by operation of element 414. If no further records remain to be processed, operation of element 414 is completed and processing continues as described above with respect to FIG's. 4 and 5. If additional records retrieved from the rules argument tables 312 and 328 remain to be processed, processing continues with elements 802-806. Element 802 is next operable to determine if an entry already exists in the AND'ing table 352 corresponding to the rule__id column value of the rules argument tables record being processed. If such an entry already exists in AND'ing table 352 corresponding to the rule__id column value of the rules argument entry currently being processed, then processing continues with element 804 to increment the count column 356 value of the corresponding AND'ing table entry. Otherwise, processing continues at element 806 to generate and insert a new entry in AND'ing table 352 corresponding to the rule__id of the rule argument entry being processed. Specifically, element 806 generates a new AND'ing table entry having a rule__id column value equal to the rule__id column value of the rule argument table entry being processed and having a count column value entry of one. In either case, following processing by element 804 or element 806, processing continues by looping back to element 800 to determine if further rules argument entries remain to be processed and added to the AND'ing table 352.

As discussed above with respect to FIGS. 4 and 5, the entries in the AND'ing table are utilized to determine which rules have satisfied all their constituent boolean predicate terms and are thereby triggered. The triggered rules then determine actions to be taken in response to the receipt of the published message. A typical action as discussed above is the transmission (distribution) of the published message to one or more subscribing processes/applications or other subscribing functions operating within the distributed computing application.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a rules based message processing subsystem operable in a computing system, a method for evaluating rules comprising boolean predicate statements for message processing comprising the steps of:

receiving a message for processing;

searching, responsive to reception of said message, a table of rule arguments to locate only rule arguments which apply to said message based upon information content of said message wherein each of said rule arguments in said table is a boolean predicate and wherein a rule is comprised of at least one of said rule arguments;

evaluating, responsive to the searching step, the located rule arguments to determine the truth of the boolean predicate statements contained therein; and determining the truth of rules comprised of the evaluated rule arguments.

2. The method of claim 1 further comprising the step of:

performing an action associated with said rules responsive to the determining the truth of said rules.

3. The method of claim 2 wherein said desired action includes transmission of said message to a process in a computing system.

4. The method of claim 1 wherein the searching step includes the steps of:

generating a key value from said message; and locating rule arguments in said table which are related to a message type field of said message.

5. The method of claim 4 further comprising the step of:

locating rule arguments in said table which compare a particular field in said message to an identified fixed value.

6. The method of claim 4 further comprising the step of:

locating rule arguments in said table which compare a first identified field in said message to a second identified field in said message.

7. The method of claim 1 wherein the searching step includes the steps of:

generating a key value from said message;

searching an operations table to locate rule identifiers in said operations table which are related to a message type field of said message; and searching, arguments responsive to searching of said operations table, said table of rule arguments using said rule identifiers to locate said rule.

8. The method of claim 7 wherein the step of searching said operations table includes the step of:

locating rule identifiers in said operations table which compare a particular field in said message to an identified fixed value.

9. The method of claim 7 wherein the step of searching said operations table includes the step of:

locating rule identifiers in said operations table which compare a first identified field in said message to a second identified field in said message.

10. The method of claim 1 wherein the step of evaluating includes the step of:

recording results of the evaluation of said located rule arguments in an ANDing table, and wherein the step of determining includes the step of:

processing said ANDing table to determine the truth of said rules.

11. A message processing system for processing messages published by a computing system process comprising:

means for receiving a message for processing;

means for searching, responsive to reception of said message, a table of rule arguments to only locate arguments which apply to said message based upon information content of said message wherein each of said rule arguments in said table is a boolean predicate and wherein a rule is comprised of at least one of said rule arguments;

means for evaluating, responsive to the searching step, the located rule arguments to determine the truth of the boolean predicate statements contained therein;

means for determining the truth of rules comprised of the evaluated rule arguments; and means for performing an action associated with said located rule responsive to the evaluation of a located rule resulting in a boolean true value.

12. The system of claim 11 wherein said desired action includes transmission of said message to a computing system.

13. The system of claim 11 wherein the searching means includes:

means for generating a key value from said message; and means for locating rule arguments in said table which are related to a message type field of said message.

14. The system of claim 13 further comprising:

means for locating rule arguments in said table which compare a particular field in said message to an identified fixed value.

15. The system of claim 13 further comprising:

means for locating rule arguments in said table which compare a first identified field in said message to a second identified field in said message.

16. The system of claim 11 wherein the searching means includes:

means for generating a key value from said message;

means for searching an operations table to locate rule identifiers in said operations table which are related to a message type field of said message; and p1 means for searching, arguments responsive to searching of said operations table, said table of rule arguments using said rule identifiers to locate said rule.

17. The system of claim 16 wherein the means for searching said operations table includes:

means for locating rule identifiers in said operations table which compare a particular field in said message to an identified fixed value.

18. The system of claim 16 wherein the means for searching said operations table includes:

means for locating rule identifiers in said operations table which compare a first identified field in said message to a second identified field in said message.

19. The system of claim 11 wherein the means for evaluating includes:

means for recording results of the evaluation of said located rule arguments in an ANDing table, and wherein the means for determining includes:

means for processing said ANDing table to determine the truth of said rules.

20. A program storage device readable by a computer, tangibly embodying a program or instructions executable by the computer to perform the method steps for evaluating rules comprising boolean predicate statements for processing of messages, said method steps comprising:

receiving a message for processing;

searching, responsive to reception of said message, a table of rule arguments to locate only rule arguments which apply to said message based upon information content of said message wherein each of said rule arguments in said table is a boolean predicate and wherein a rule is comprised of at least one of said rule arguments;

evaluating, responsive to the searching step, the located rule arguments to determine the truth of the boolean predicate statements contained therein; and determining the truth of rules comprised of the evaluated rule arguments.

21. The program storage device of claim 20 the method further comprising the step of:

performing, responsive to determining the truth of said rules, an action associated with said rules.

22. The program storage device of claim 21 wherein said desired action includes transmission of said message to a process in a computing system.

23. The program storage device of claim 20 wherein the method searching step includes the steps of:

generating a key value from said message; and locating rule arguments in said table which are related to a message type field of said message.

24. The program storage device of claim 23 the method further comprising the step of:

locating rule arguments in said table which compare a particular field in said message to an identified fixed value.

25. The program storage device of claim 23 the method further comprising the step of:

locating rule arguments in said table which compare a first identified field in said message to a second identified field in said message.

26. The program storage device of claim 20 wherein the method searching step includes the steps of:

generating a key value from said message;

searching an operations table to locate rule identifiers in said operations table which are related to a message type field of said message; and searching, arguments responsive to searching of said operations table, said table of rule arguments using said rule identifiers to locate said rule.

27. The program storage device of claim 26 wherein the method step of searching said operations table includes the step of:

locating rule identifiers in said operations table which compare a particular field in said message to an identified fixed value.

28. The program storage device of claim 26 wherein the method step of searching said operations table includes the step of:

locating rule identifiers in said operations table which compare a first identified field in said message to a second identified field in said message.

29. The program storage device of claim 20 wherein the method step of evaluating includes the step of:

recording results of the evaluation of said located rule arguments in an ANDing table, and wherein the method step of determining includes the step of:

processing said ANDing table to determine the truth of said rules.

30. In system for evaluating boolean rules in response to a received message comprising:

a rules argument table containing a plurality of entries wherein each of said entries defines a boolean predicate applicable to a field of said message and wherein each said entry includes a rule identifier field and wherein entries having a common value in said rule identifier field are ANDed predicates in a rule; and means for searching said rules argument table in response to receipt of said message to locate entries applicable to said message based on content of at least one field of said message;

means for evaluating the boolean predicates in the located entries responsive to said means for searching;

an ANDing table associated with said means for evaluating for recording the boolean truth of the evaluated boolean predicates; and means for determining the truth of rules for which entries are recorded in said ANDing table.

31. The system of claim 30 further comprising:

an operations table having a plurality of entries wherein each of said entries identifies a field of said message for which a boolean predicate is defined in an entry of said rules table, and wherein the means for searching includes:

means for searching said operations table to locate key values for rule argument table entries which apply to said rule; and means for searching said rules argument table using said key values to locate entries which need be evaluated in response to receipt of said message.

* * * * *